United States Patent
Li et al.

(10) Patent No.: US 7,935,735 B2
(45) Date of Patent: May 3, 2011

(54) HYBRID INORGANIC-ORGANIC POLYMER ELECTROLYTE MEMBRANES (PEMS) BASED ON ALKYLOXYSILANE GRAFTED THERMOPLASTIC POLYMERS

(75) Inventors: Siwen Li, Atlanta, GA (US); Meilin Liu, Alpharetta, GA (US); Qunhui Sun, Kennesaw, GA (US); Wen Li, Ann Arbor, MI (US)

(73) Assignees: Toyota Motor Engineering & Manufacturing North America, Inc., Erlanger, KY (US); Georgia Tech Research Corporation, Atlanta, GA (US)

( * ) Notice: Subject to any disclaimer, the term of this patent is extended or adjusted under 35 U.S.C. 154(b) by 1163 days.

(21) Appl. No.: 10/558,522

(22) PCT Filed: May 28, 2004

(86) PCT No.: PCT/US2004/016896
§ 371 (c)(1), (2), (4) Date: Dec. 18, 2006

(87) PCT Pub. No.: WO2005/001037
PCT Pub. Date: Jan. 6, 2005

(65) Prior Publication Data
US 2007/0100078 A1 May 3, 2007

Related U.S. Application Data

(60) Provisional application No. 60/473,812, filed on May 28, 2003.

(51) Int. Cl.
*H01M 6/18* (2006.01)
*H01M 8/10* (2006.01)
*H01G 9/02* (2006.01)
*B01J 49/00* (2006.01)

(52) U.S. Cl. ......... 521/27; 429/306; 429/492; 429/313; 252/62.2

(58) Field of Classification Search .................. 526/279; 525/242, 244, 254, 326.2, 326.3, 326.5; 252/62.2; 429/306, 313
See application file for complete search history.

(56) References Cited

U.S. PATENT DOCUMENTS

| | | | | |
|---|---|---|---|---|
| 2,681,319 A * | 6/1954 | Bodamer | ......................... | 521/27 |
| 3,716,391 A * | 2/1973 | Hosoda et al. | ................ | 427/302 |
| 4,294,933 A * | 10/1981 | Kihara et al. | ................... | 521/27 |
| 4,491,650 A | 1/1985 | Rizk et al. | | |
| 4,567,107 A | 1/1986 | Rizk | | |
| 4,604,443 A * | 8/1986 | Chang et al. | .................... | 528/28 |
| 4,753,993 A * | 6/1988 | Keogh | .......................... | 525/100 |
| 5,173,205 A * | 12/1992 | Marchese et al. | ............ | 252/62.2 |
| 5,501,920 A * | 3/1996 | Andrei et al. | ................. | 429/192 |
| 5,834,107 A * | 11/1998 | Wang et al. | ................ | 428/310.5 |
| 6,448,343 B1 | 9/2002 | Schombourg | | |
| 2003/0003340 A1* | 1/2003 | Honma et al. | ................... | 429/33 |
| 2004/0053060 A1* | 3/2004 | Roziere et al. | ................ | 428/447 |

FOREIGN PATENT DOCUMENTS

JP 02291603 A 12/1990

OTHER PUBLICATIONS

Liu et al. Synthesis, characterization and electrochemical transport properties of the poly(ethyleneglycol)-grafted poly(vinylidenefluoride) nanoporous membranes. Elsevier. Reactive & Functional Polymers. 47. 2001. 201-203.*
PCT Search Report , mailed Dec. 6, 2004 for PCT/US04/16896.

* cited by examiner

*Primary Examiner* — David Wu
*Assistant Examiner* — Elizabeth Eng
(74) *Attorney, Agent, or Firm* — Gifford, Krass, Sprinkle, Anderson & Citkowski, P.C.

(57) ABSTRACT

A composition of matter is formed from a graftable polymer, having graftable sites onto which sidechains have been grafted. The sidechains include at least one silane group, and may be formed by polymerization of a polymerizable group of a silane precursor. These compositions may further include acid groups, and may be used, for example, in improved proton conducting materials in fuel cells.

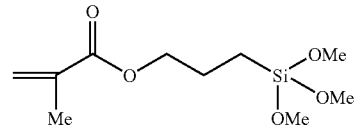

18 Claims, 1 Drawing Sheet

HYBRID INORGANIC-ORGANIC POLYMER ELECTROLYTE MEMBRANES (PEMS) BASED ON ALKYLOXYSILANE GRAFTED THERMOPLASTIC POLYMERS

REFERENCE TO RELATED APPLICATION

This application claims priority to U.S. Provisional Application Ser. No. 60/473,812, filed May 28, 2003, the entire contents of which are incorporated herein by reference.

FIELD OF THE INVENTION

The present invention relates to polymeric materials, in particular to proton-conducting polymers for use in fuel cells.

BACKGROUND OF THE INVENTION

Proton electrolyte membranes have been studied in many years, but the existing membranes are still inadequate in performance for many applications. Polymer proton conductors, such as perfluorosulfonic polymers (such as Nafion), have good chemical, electrochemical and mechanical stability, but they have serious disadvantages, such as low proton conductivity at low humidity and high temperature, dimensional changes with water contents, poor hydrophilicity, large amount of fuel crossover, and high cost. The fuel cells with these conventional PEMs as the electrolytes can be operated usually below 80° C.

However, to date, conventional hybrid inorganic-organic proton conducting membranes do not have adequate thermal stability to be used above 120° C., especially when the membranes have —SO$_3$H groups.

Conventional polymer chemistry techniques are disclosed in U.S. Pat. No. 3,408,420 to Wiggill, U.S. Pat. No. 4,707,517 to Bullen et al., U.S. Pat. No. 5,389,726 to Sojka, U.S. Pat. No. 5,453,467 to Bamford et al., U.S. Pat. No. 5,840,800 to Joffre et al., U.S. Pat. No. 6,201,064 to Aoyama et al., and U.S. Pat. No. 6,719,920 to Arhart et al.; U.S. Pat. App. Pub. No. 2002/0127474 to Fleischer et al.; and Int. Pat. App. Pub. No. WO04/005380 to Oren et al. Techniques disclosed in the above mentioned patents and publications can be adapted for use in preparing materials according to the present invention.

SUMMARY OF THE INVENTION

A composition of matter is formed from a graftable polymer, having graftable sites onto which sidechains have been grafted. The sidechains include at least one silane group, and may be formed by polymerization of a polymerizable group of a silane precursor. These compositions may be used in improved proton conducting materials, for example, for use in fuel cells.

DETAILED DESCRIPTION

Novel proton-conductive membranes are prepared that include thermoplastic polymers (including rubbers) that are stable at high temperatures and have excellent mechanical properties.

To form a stable network with an inorganic component (Si—O—Si chains or networks), organic polymer chains, or monomers thereof, are activated, by attachment of alkoxysilyl groups to the polymer chains through graft-copolymerization.

Figure 1:
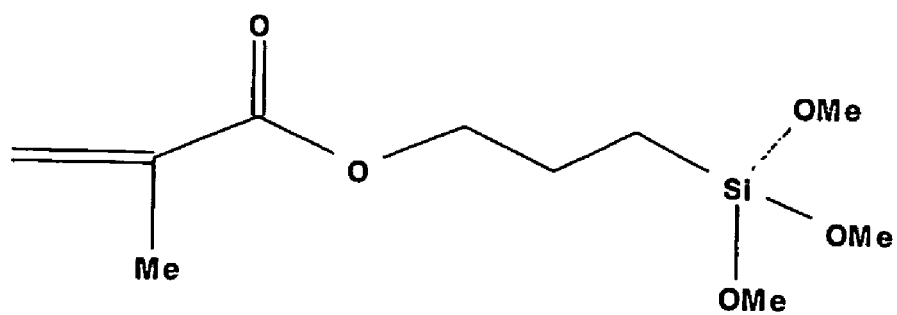
FIG. 1 shows the molecular structure of trimethoxysilyl methacrylate (TSMA)

FIG. 1 shows the molecular formula of an example compound, methacryloxypropyltrimethoxysilane or trimethoxysilyl methacrylate (TSMA).

Figure 2:
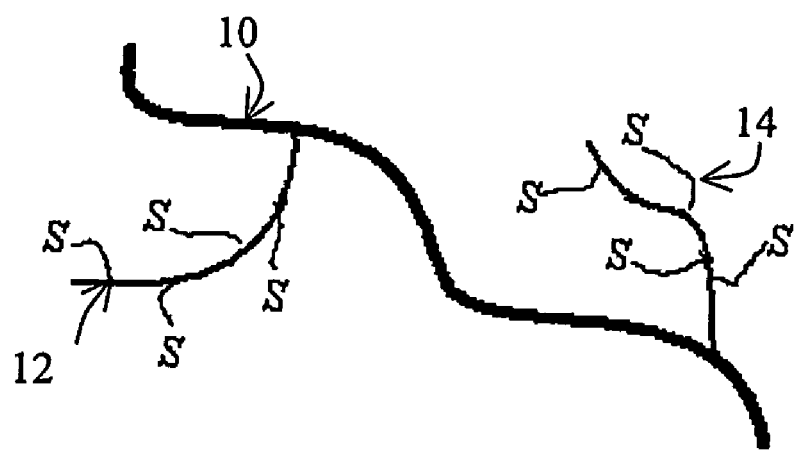
FIG. 2 is a schematic representation of an example polymer according to the present invention.

FIG. 2 illustrates a representative structure of a grafted polymer chain, such as the structure of SBS-g-TSMA or PVDF-g-TSMA. In one illustrative example, the thicker line 10 represents a polymer chain, the line 12 represents a grafted methacrylate backbone, and S represents a silane group such as trimethoxysilyl.

An activated polymer can be dissolved in certain solvents together with one or more other silanes, allowing copolymerization. For example, a polymer (or a monomer or oligomer) including an alkoxysilyl group can be co-polymerized with one or more other silanes, such as alkoxysilanes including tetraethoxysilane (TEOS), and sulfonated phenyltriethoxysilane (SPTEOS), and hydrolyzed by water with acid as a catalyst.

For example a polymer including an alkoxysilyl group can be co-polymerized with tetraethoxysilane (TEOS) and/or sulfonated phenyltriethoxysilane (SPTEOS), and hydrolyzed by water with acid as a catalyst. After the sols are stirred, typically for several hours, other proton conducting components, such as H$_3$PO$_4$, imidazole, benzimidazole, and 2-phenyl imidazole, can be added and further stirred, again typically for several hours. Then, the sols can be cast, for example in petri dishes, and heated in dry oven at 60° C. for several days to form gels or cure and evaporate the solvents.

Control of the solvent evaporation rate allows better control of the final mechanical properties of the membranes, as these can be affected by the evaporation rate.

Polymers which can be introduced into improved proton electrolyte membranes according to this invention include poly(vinylidine fluoride) (PVDF), poly(vinylidine fluoride-hexafluoropropylene) (PVDF-HFP), poly(styrene butadiene) copolymers (SBR), styrene-butadiene-styrene block copolymer (SBS), poly(tetrafluoroethylene-hexafluoropropylene) (PTE-HFP), poly(bis(trifluoroethoxy)phosphazene), poly(bis(trifluoroethoxy)phosphazene) mixed-substitute polymers (PNF rubber), poly(butadiene) rubber (PBR), poly(3-chlorobutadiene) rubber (PCBR), poly(nitrile-butadiene) copolymer (NBR), natural rubber (NR), and the like. Other polymers can also be used, preferably having a T$_g$ lower than 0° C. and high thermal stability.

Example grafted polymers include PVDF-HFP-g-MPTEOS (mercaptopropyltriethoxysilane), PVDF-g-VTEOS (vinyl triethoxysilane), and SBS-g-MPMDMOS (methacryloxypropylmethyldimethoxysilane). Polymers can also be grafted with two or more different silane species, for example as in PVDF-HFP-g-MPTEOS/TEOS/SPTEOS (sulfonated phenyltriethoxysilane) or SBS-g-MPMDMOS/TEOS.

Precursors

Organosilicon precursors grafted to polymer chains according to this invention can have the following formula:

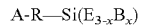

where A is a functional group, R is a linking group, E is a first substituent group, and B is a second substituent group.

Examples of functional groups include vinyl, acrylate, or methacrylate groups. Functional groups may be polymerizable with each other, or copolymerizable with other components, such as other organosilicon precursors. Other examples of functional groups include hydroxyl (OH), halogen (—X), thiol (—SH), epoxy ring, amines (such as —$NH_2$), and the like, allowing grafting on to a pre-existing polymer. Other examples may include epoxies, urethanes, styrenes, and other groups known in the polymer chemistry arts.

Examples of linking groups include alkyl chains (such as alkyls from $C_1$ to $C_{20}$), and other flexible chains. Linking groups may include one or more carbon atoms, double bonds, oxygen atoms, rings (such as phenyl groups) or other atoms, and may be straight or branched.

Examples of first substituent groups include alkyl groups, such as methyl or ethyl, alkenyl groups, and the like.

Examples of second substituent groups include alkyloxy groups, such as ethoxy or methoxy groups.

As illustration, specific examples include (3-acryloxypropyl)dimethylmethoxysilane, (3-acryloxypropyl) methyldimethoxysilane, (3-acryloxypropyl) trimethoxysilane, 3-N-allylamino)propyltrimethoxysilane, allyltriethoxysilane, allyltrimethoxysilane, butenyltriethoxysilane, docosenyltriethoxysilane, (methacryloxymethyl)dimethylethoxysilane, methacryloxymethyltriethoxysilane, methacryloxymethyltrimethoxysilane, methacyloxypropyldimethylethoxysilane, metacyloxypropyldimethylmethoxysilane, methacryloxypropylmethyldiethoxysilane, methacryloxypropylmethyldimethoxysilane, methacryloxypropyltriethoxysilane, 7-octenyltrimethoxysilane, styrylethyltrimethoxysilane, vinyltrimethoxysilane, vinyltriethoxysilane, derivatives thereof, and the like.

One example method for grafting an organosilicon to a polymer chains is a radical polymerization, for example one that is initiated by a chemical initiator or UV photografting.

Conventional polymer grafting techniques known in the polymer chemistry art can be adapted for use in preparing materials according to the present invention. However, compounds according to the present invention are not limited to those prepared by the above mentioned techniques.

In the examples of PVDF or PVDF-HFP, the polymer can be treated by ozone first, and then the ozone-activated polymer provides a co-polymerization reaction with an organosilicon precursor, such as those listed above. Other pre-treatments of a suitable treatable polymer include chemical treatment (for example with an initiator), UV or other radiation exposure, and the like.

In other examples, a polymer can be provided with functional groups (such as hydroxyl groups, halides, acid groups, and the like), so that silanes or silane-containing sidechains can be grafted to the polymer without the need for any particular polymer pre-treatment.

EXAMPLES

Example 1

Synthesis of PVDF-HFP-g-MPTEOS: A PVDF-HFP powder with an average molecular weight of about 450000 was dissolved in N-methyl-2-pyrrolidone (NMP) with a concentration of 75 g/L. A continuous $O_3/O_2$ flow, where the ozone was generated by an ozone generator, was bubbled through in a flow rate of 300 L/H at room temperature. The treatment time can be 20 to 60 minutes to give the ozone content of about $2 \times 10^{-4}$ mol per gram of polymer.

After treatment, the polymer solution was cooled in an ice bath quickly, and the ozone-treated PVDF-HFP polymer was precipitated by excess ethanol, filtered, and dried under reduced pressure at room temperature. 1 g of the ozone-treated PVDF-HFP was mixed with the amount of methacryloxypropyltriethoxysilane (MPTEOS) from 1 g to 3 g in 20 ml of NMP, and the mixture was introduced into a 3-neck flask with a magnetic stirrer, a condenser and a $N_2$ gas line.

The reactor flask was placed in a thermostated oil bath at 90° C. with stirring for 3 hours under the protection of $N_2$, and then cooled into an ice bath. The mixture of the reaction was treated by an excess ethanol to get the PVDF-HFP-g-MPTEOS copolymer as precipitate, and remove the homopolymer of MPTEOS. After filtration, the PVDF-HFP-g-MPTEOS copolymer was washed three times with large amounts of ethanol to remove all MPTEOS homopolymer.

Example 2

Synthesis of PVDF-g-VTEOS: The PVDF powders was dissolved in N-methyl-2-pyrrolidone (NMP) with a concentration of 75 g/L. A continuous $O_3/O_2$ flow, where the ozone was generated by an ozone generator, was bubbled through in a flow rate of 300 L/H at room temperature. The treatment time can be 20 to 60 minutes to give an ozone content of about $2 \times 10^{-4}$ mol per gram of polymer.

After treatment, the polymer solution was cooled in an ice bath quickly, and the ozone-treated PVDF polymer was precipitated by excess ethanol, filtered, and dried under reduced pressure at room temperature. 1 g of the ozone-treated PVDF was mixed with the amount of vinyltrimethoxysilane (VTEOS) from 1 g to 3 g in 20 ml of NMP, and the mixture was introduced into a 3-neck flask with a magnet stirrer, a condenser and a $N_2$ gas line.

The reactor flask was placed in a thermostated oil bath at 100° C. with stirring for 3 hours under the protection of $N_2$, and then cooled into an ice bath. The mixture of the reaction was treated by an excess ethanol to get the PVDF-g-VTEOS copolymer was precipitate, and remove the homopolymer of VTEOS. After filtration, the PVDF-g-VTEOS copolymer was washed with a large amount of ethanol three times to remove all VTEOS homopolymer.

Example 3

Synthesis of SBS-g-MPMDMOS: 1 g of Styrene-Butadiene-Styrene block copolymer (SBS) was dissolved in 40 ml tetrahydrogenfuran (THF) completely by stirring in a three-neck flask with a condenser and a gas line. 1.5 g of methacryloxypropylmethyldimethoxysilane (MPMDMOS) and 0.1 g initiator benzoyl peroxide (BPO, $4 \times 10^{-4}$ mol) were added to the solution.

The reaction flask was put into oil bath and kept at 65° C. for at least 6 hours under the protection of Ar. After the mixture was cooled, it was poured into excess amount of methanol and stirred for several hours to dissolve the unreacted MPMDMOS and MPMDMOS homopolymers. The precipitate was filtrated, washed with methanol for three times to get the mixture of SBS-g-MPMDMOS, SBS and crosslinked SBS. Cyclohexane was used as a solvent to remove SBS from the mixture, and then the mixture was dissolved into 1,4-dioxane to remove the insoluble crosslinked SBS. After filtration, 1,4-dioxane was evaporated under reduced pressure to get pure SBS-g-MPMDMOS.

Example 4

Synthesis of PSB-g-MPTEOS: 1 g of Poly(styrene butadiene) copolymers (SBR), was dissolved in 20 ml toluene completely by stirring in a three-neck flask with a condenser and a gas line. 1.5 g of methacryloxypropyltriethoxysilane (MP- TEOS) and 0.1 g initiator Benzoyl peroxide (BPO, $4\times10^{-4}$ mol) were added to the solution.

The reaction flask was put into oil bath and kept at 80° C. for at least 6 hours under the protection of Ar. After the mixture was cooled, it was poured into excess amount of methanol and stirred for several hours to dissolve the unreacted MPTEOS and MPTEOS homopolymers. The precipitate was filtrated, washed with methanol for three times to get the mixture of PSB-g-MPTEOS, PSB and crosslinked SBR. Cyclohexane was used as a solvent to remove PSB from the mixture, and then the mixture was dissolved into 1,4-dioxane to remove the insoluble crosslinked SBR. After filtration, 1,4-dioxane was evaporated under reduced pressure to get pure PSB-g-MPTEOS.

Example 5

Manufacture of proton conducting hybrid inorganic-organic membranes: PVDF-HFP-g-MPTEOS copolymer, tetraethoxysilane (TEOS) and sulfonated phenyltriethoxysilane (SPTEOS) were dissolved in certain amount of ethyl acetate. The weight ratio of PVDF-HFP-g-MPTEOS copolymer to total of TEOS and SPTEOS can be from 20/80 to 80/20, and that of TEOS to SPTEOS from 10/90 to 90/10. 0.5 N HCl aqueous solution was added and stirred. The amount of water added can be 4 moles to one mole of total Si in the solution.

After stirring for 3 hours for complete hydrolysis, 85% $H_3PO_4$ aqueous solution was added and further stirred for at least 6 hours. The obtained transparent sols were cast into covered glass petri dishes, and heated at 60° C. in dry oven for one day, and then a small hole was made on the cover of the dish to evaporate the solvent slowly. After 3 or 4 days, the cover of the dish was removed, and further heated for 1 day. Finally, the membranes were heated at 80° C. for 12 hours. Proton conducting hybrid inorganic-organic membranes were obtained. They were transparent, flexible, and thermally stable up to 200° C. Their proton conductivity in a dry condition is over $10^{-3}$ S/cm above 120° C.

Example 6

Manufacture of proton conducting hybrid inorganic-organic membranes: SBS-g-MPMDMOS copolymer and tetraethoxysilane (TEOS) were dissolved in certain amount of THF. The weight ratio of SBS-g-MPMDMOS copolymer to TEOS can be from 20/80 to 80/20. 0.5 N HCl aqueous solution was added to the solution and stirred. The amount of water added can be 4 moles to one mole of total Si in the solution. After stirring for 3 hours for complete hydrolysis, $H_3PO_4$ 85% aqueous solution was added and further stirred for at least 6 hours. 2-phenyl imidazole (PI) solution in ethanol was added dropwise to the viscous sols, and further stirred for 30 minutes (the amount of PI should be less than 20% of $H_3PO_4$ in moles). The obtained sols were cast into covered glass petri dishes, and heated at 60° C. in dry oven for one day, and then a small hole was made on the cover of the dish to evaporate the solvent slowly. After 3 or 4 days, the cover of the dish was removed, and further heated for 1 day. At last the membranes were heated at 80° C. for 12 hours. The proton conducting hybrid inorganic-organic membranes were obtained. The membranes are uniform, flexible and thermally stable up to 200° C. Their proton conductivity in a dry condition is over $10^{-3}$ S/cm above 130° C.

The new class of proton conducting membranes described above can provide increased stability at high temperatures, good mechanical properties, and acceptable or good proton conductivities.

Acid Groups

Acid group species can also be attached to the network, for example, inorganic acid groups such as sulfonic acid group (—$SO_3H$), phosphoric acid groups (—$PO_3H$), boronic acid (—$B(OH)_2$), and the like, and/or organic acid groups such as a carboxylic acid groups (—COOH). In certain environments, the dissociable proton may be replaced by another ion, such as an alkali metal ion, other metal ion, ammonium ion, or the like.

Membranes formed according to the present invention can provide sufficient thermal stability to be used above 120° C., even if the membranes have included acid groups such as —$SO_3H$ groups.

Acid-containing silanes can be used in a copolymerization reaction with other compounds described herein. Acid containing silanes include silanes such as PETHS ($PO(OH)_2$—$C_2H_4$—$Si(OH)_3$, phosphoryl ethyl trihydroxyl silane, and alkyloxy analogs), acid-substituted phenyl trialkyloxy silanes (such as SPS ($Si(EtO)_3$-Ph-$SO_2OH$), and the like. Acid-containing silanes may further include a functional group as discussed above, such as a polymerizable group, and/or a group allowing grafting to an organic polymer chain. Acid-containing silanes may also include organic acid groups, such as carboxylic acid groups.

Other species that can be attached to the network include amide groups, such as bissulfonylamide groups.

Applications

Proton conducting materials can be used as membranes in fuel cells. A fuel cell according to the present invention includes a positive electrode, a negative electrode, and a proton-conducting membrane formed from proton conducting material described elsewhere.

The dimensions of the membrane will be determined by the configuration of the fuel cell, as is well known. Proton conducting materials can be produced in a form suitable for use as a membrane without further processing, or formed as a tape or sheet that can be cut to a desired shape, or further processed. Proton conducting materials can include or be disposed on one or more reinforcing sheets, such as a web material.

For example, a thermally stable material, for example in the form of a web or grid, may be included within a membrane or on its surface so as to improve the mechanical properties of the membrane. For example, a Nafion grid may be included to reduce membrane brittleness.

Hence, an example fuel cell according to the present invention includes a positive electrode, a negative electrode, and a membrane therebetween formed from a proton conducting material described herein.

Proton electrolyte membranes (PEMs) or other forms of the polymer conducting materials described herein can be used in fuel cells, hydrogen separation/purification, reforming/partial oxidation of hydrocarbon fuels, contaminant removal, gas sensing, and other processes relevant to energy storage and conversion.

Membranes with high proton conductivity but with little or no dependence on humidity in the temperature range from 100 to 200° C. are can be used in PEM fuel cells with much higher energy efficiency and tolerance of anode catalyst to carbon monoxide poisoning.

Optional Modifications

Proton conducting materials according to the present invention can further include particles such as metal-containing particles (such as nanometer-sized hygroscopic metal oxides), polymers dispersed through the membrane for improved mechanical properties, main-chain polymers having electron lone pair providing atoms within the main chain, acid-group substituted polymers (such as polymers including inorganic acid groups such as —$H_3PO_4$) and dopants such as proton-conductive inorganic compounds, such as $Zr(HPO_4)_2 \cdot H_2O$, silicotungstic acid ($SiO_2 \cdot 12WO_3 \cdot 26H_2O$), other compounds including acid groups (such as inorganic acids such as —$SO_3H$, —$PO_3H_2$), groups such as —$SO_2NHSO_2CF_3$, and —$CF_2SO_2NHSO_2CF_3$, inorganic salts such as $CsHSO_4$, and acid salts such as $Zr(HPO_4)_2$. Other proton sources and proton solvents can also be included.

In other examples, additional organosilanes, such as two or more flexibly interconnected silane groups, for example two silane groups interconnected through an alkyl chain having 2-20 carbon atoms, can be used in preparation of the membrane, for example to improve mechanical properties. For example, bisalkyloxysilyl terminated polymers, oligomers, and/or short organic chains can be used, for example silanes of the form $Si(A_{3-x}B_x)$—R—$Si(A_{3-x}B_x)$, where A can be an alkyloxy group, hydrogen, or other substituent, and B can be an alkyl group, and where R is a flexible chain. Examples of flexible chains include polypropylene oxide, polytetraethylene oxide, poly(1-butene), polyethylene, polypropylene, polyvinylidene fluoride, polystyrene, polytetrafluoroethylene, polyvinylchloride, and polyvinylalcohol. Hence, examples include bis(alkyloxysilyl)-terminated polymer compounds. Other examples of flexible chains include straight chain alkyl groups with 2-20 carbon atoms, polyethylene oxide (PEO), polypropylene oxide (PPO) and polytetramethylene oxides (PTMO), derivatives thereof, other chains comprising carbon, hydrogen, and optionally oxygen, and other chains.

Proton conducting materials according to the present invention can further comprise small molecules analogous to the terminal groups discussed above in relation to silane precursors, such as imidazole and its derivatives (including 2-ethyl, 4-methylimidazole and benzimidazole), or other nitrogen-containing heterocycles and their derivatives. Such compounds can be added to improve the proton conductivity of the materials.

The resistance of a membrane to water induced degradation can be increased by including insoluble acid salts in the membrane, such as cesium hydrogen sulfate ($CsHSO_4$) or cesium hydrogen phosphate ($CsH_2PO_4$).

Patents or publications mentioned in this specification are herein incorporated by reference to the same extent as if each individual publication was specifically and individually indicated to be incorporated by reference. In particular, U.S. Prov. App. Ser. No. 60/473,812, filed May 28, 2003, is incorporated herein in its entirety by reference. U.S. Prov. App. entitled "Polymer Electrolyte Membranes (PEMs) based on imidazole ring terminated flexible branches grafted on hybrid inorganic-organic polymers", to Li et al., filed May 28, 2003, is also incorporated by reference.

The invention is not restricted to the illustrative examples described above. Examples are not intended as limitations on the scope of the invention. Changes therein, other combinations of elements, and other uses will occur to those skilled in the art. The scope of the invention is defined by the scope of the claims.

Having described our invention, we claim:

1. A process for forming a polymer electrolyte membrane, the process comprising:
    providing a graftable polymer, the graftable polymer having a plurality of graftable sites;
    providing a silane compound, the silane compound including a silane group and a functional group,
    the functional group being selected from a group consisting of vinyl, acrylate, methacrylate, epoxy, styrene, and urethane;
    grafting sidechains onto graftable sites of the graftable polymer, the sidechains being derived at least in part from polymerization of the functional group of the silane compound, so as to provide a polymer material having a plurality of silane groups within the sidechain; and
    hydrolyzing the plurality of silane groups so as to form the polymer electrolyte membrane.

2. The process of claim 1, wherein the graftable polymer is a thermoplastic polymer.

3. The process of claim 1, wherein hydrolyzing the plurality of silane groups is part of a copolymerization reaction with a second silane compound.

4. The process of claim 3, wherein the second silane compound is an alkyloxysilane.

5. The process of claim 1, wherein the silane compound further includes a functional group, and grafting sidechains onto graftable sites of the graftable polymer comprises polymerization of the functional group.

6. The process of claim 5, wherein the sidechains each include a chain formed by polymerization of the functional group.

7. The process of claim 1, wherein the graftable polymer has organic sidechains, the organic sidechains providing the graftable sites.

8. The process of claim 1, wherein the graftable polymer is provided by a treatment of a treatable polymer.

9. The process of claim 8, wherein the treatable polymer is a thermoplastic.

10. The process of claim 8, wherein the treatment includes exposure of the treatable polymer to ozone.

11. A fuel cell including the polymer electrolyte membrane of claim 1.

12. A process for producing a polymer electrolyte membrane, the process comprising:
    providing an organic polymer having graftable sites;
    grafting sidechains to the graftable sites, each sidechain providing at least one silane group; and
    hydrolyzing silane groups provided by the sidechains so as to at least partially cross-link the organic polymer, to form the polymer electrolyte membrane,
    wherein grafting sidechains to the graftable sites includes providing a silane compound having a silane group and further including a functional group,
    the functional group being a vinyl, acrylate, methacrylate, epoxy, styrene, or urethane group,
    the sidechains being grafted to the organic polymer using a radical polymerization technique.

13. The process of claim 12, wherein grafting sidechains to the graftable sites includes a polymerization of the functional groups.

14. The process of claim 12, wherein grafting sidechains to the graftable sites includes reacting the functional groups with the graftable sites.

15. The process of claim 12, wherein each sidechain includes at least two flexibly interconnected silane groups.

16. The method of claim 1, wherein the silane further includes an acid group.

17. The method of claim 1, hydrolysis of the plurality of silane groups occurring after grafting the sidechains to the graftable polymer.

18. The method of claim 10, wherein the polymer is poly(vinylidine fluoride) or poly(vinylidine fluoride-hexafluoropropylene).

* * * * *